Figure 20:
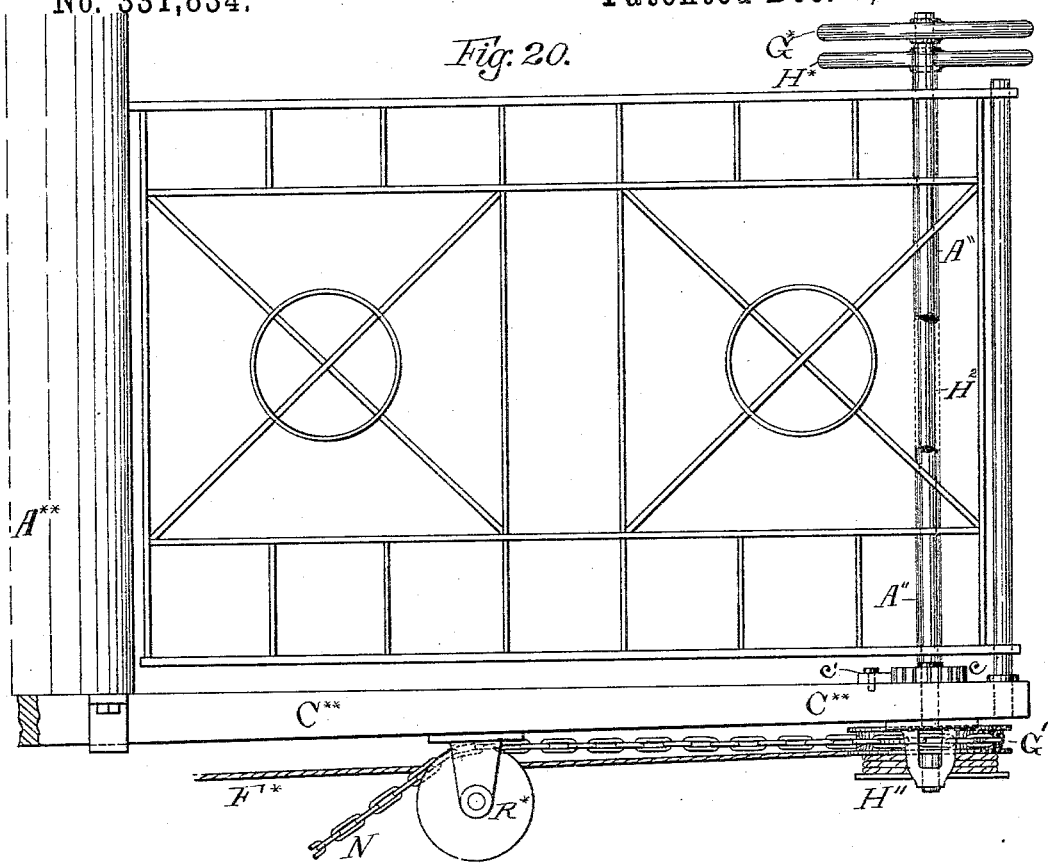

(No Model.)
7 Sheets—Sheet 1.
R. SOLANO.
CABLE RAILWAY.
No. 331,834.
Patented Dec. 8, 1885.
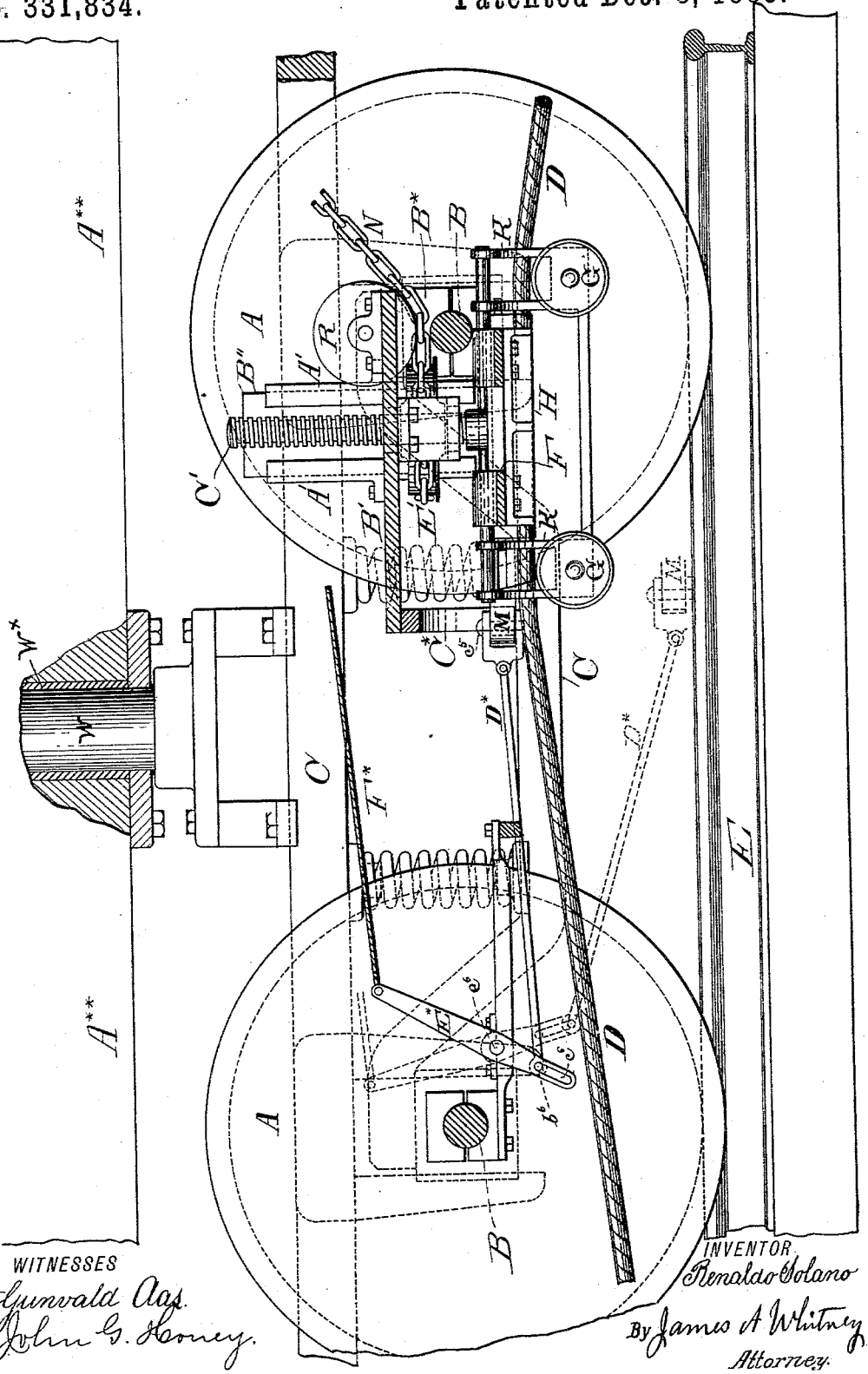
WITNESSES
Gunvald Aas.
John G. Honey.
INVENTOR
Renaldo Solano
By James A. Whitney
Attorney.

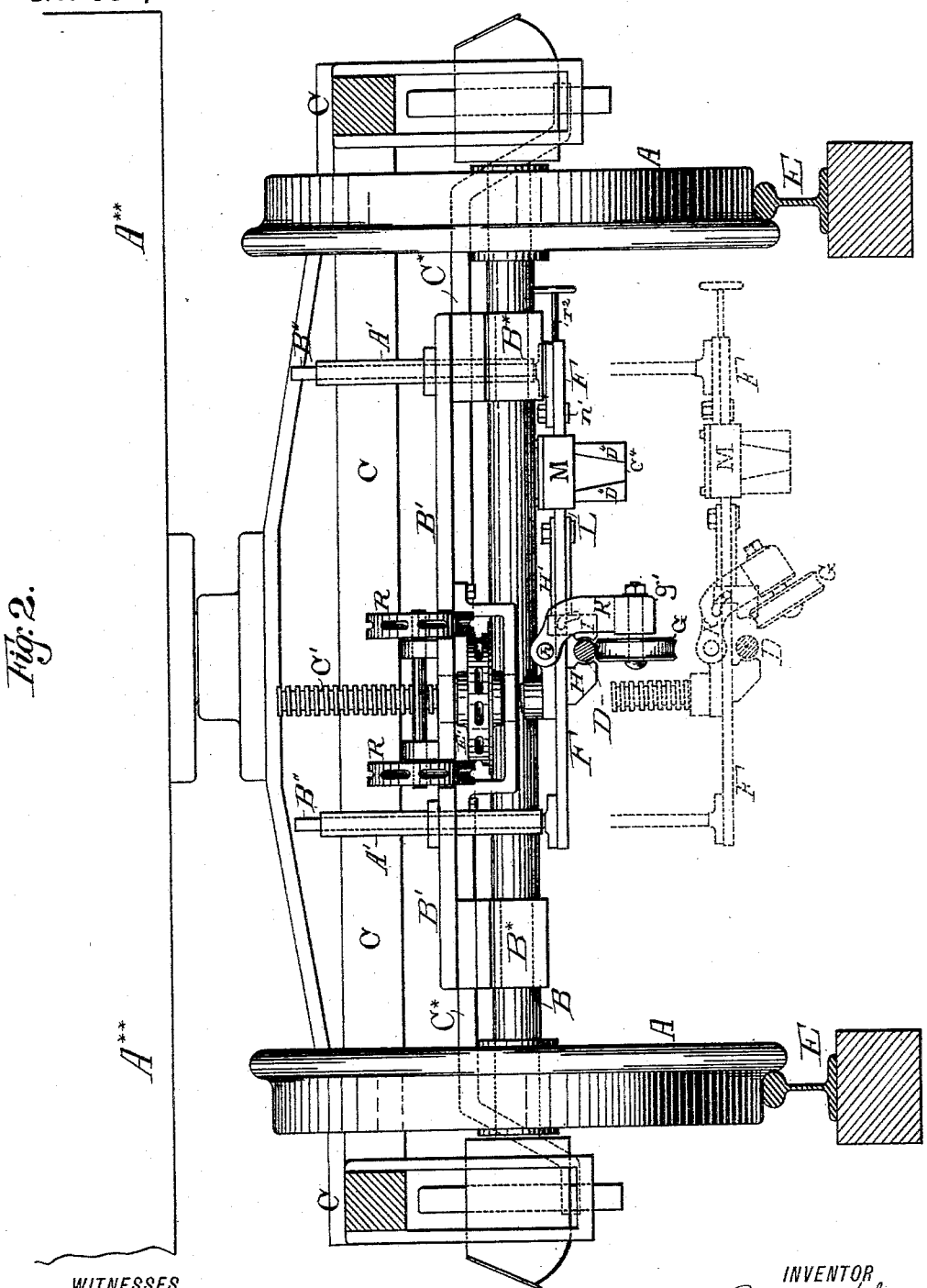

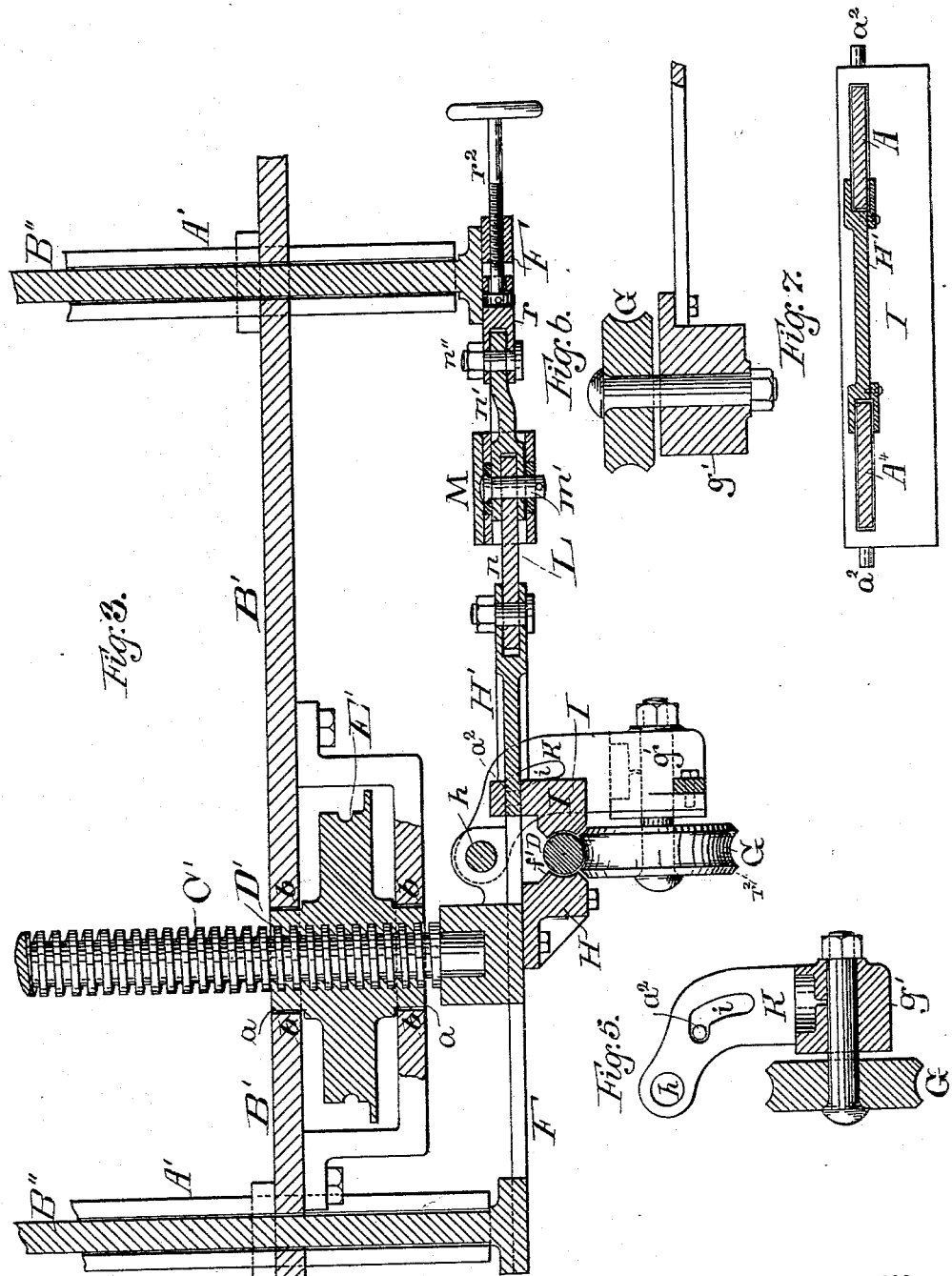

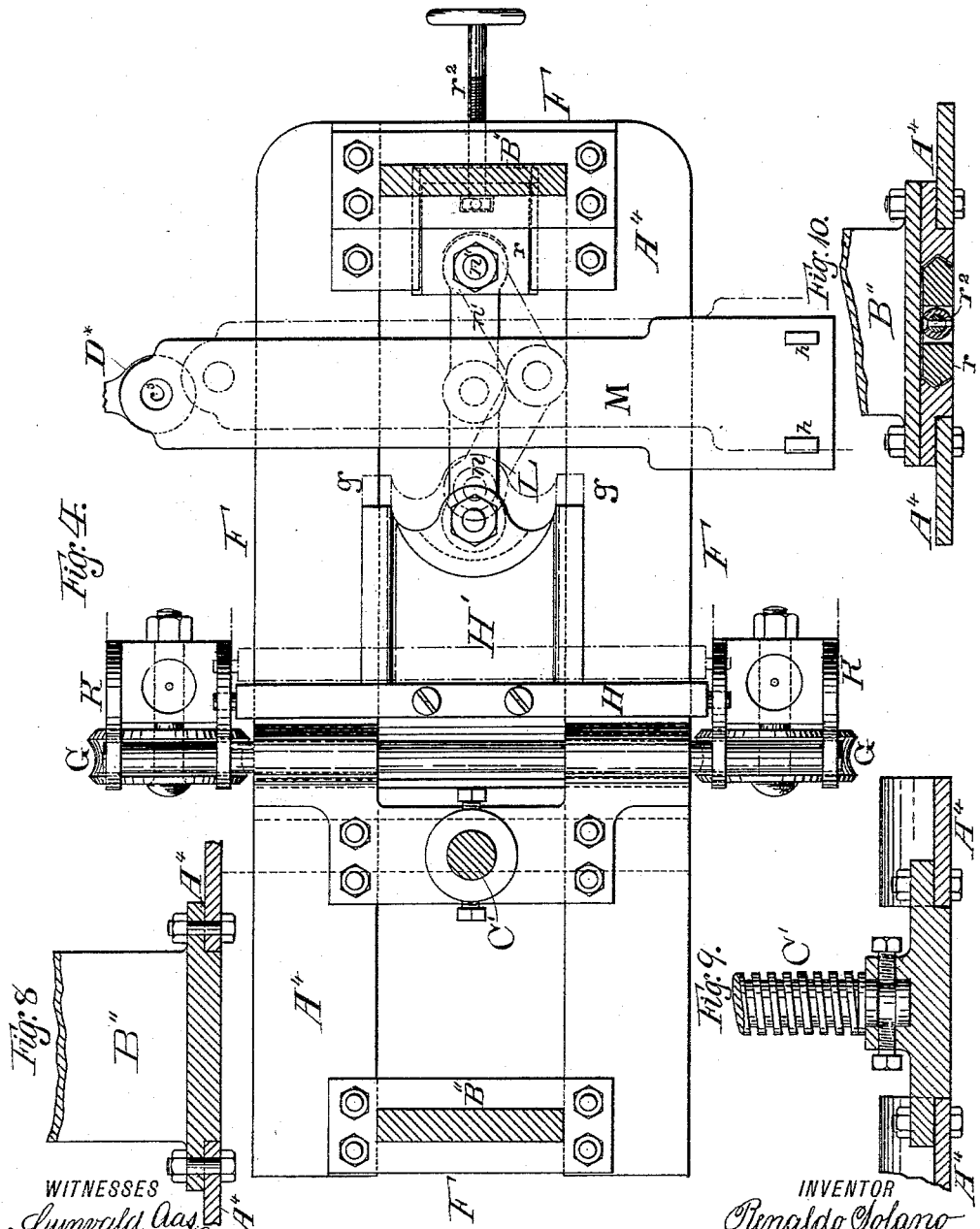

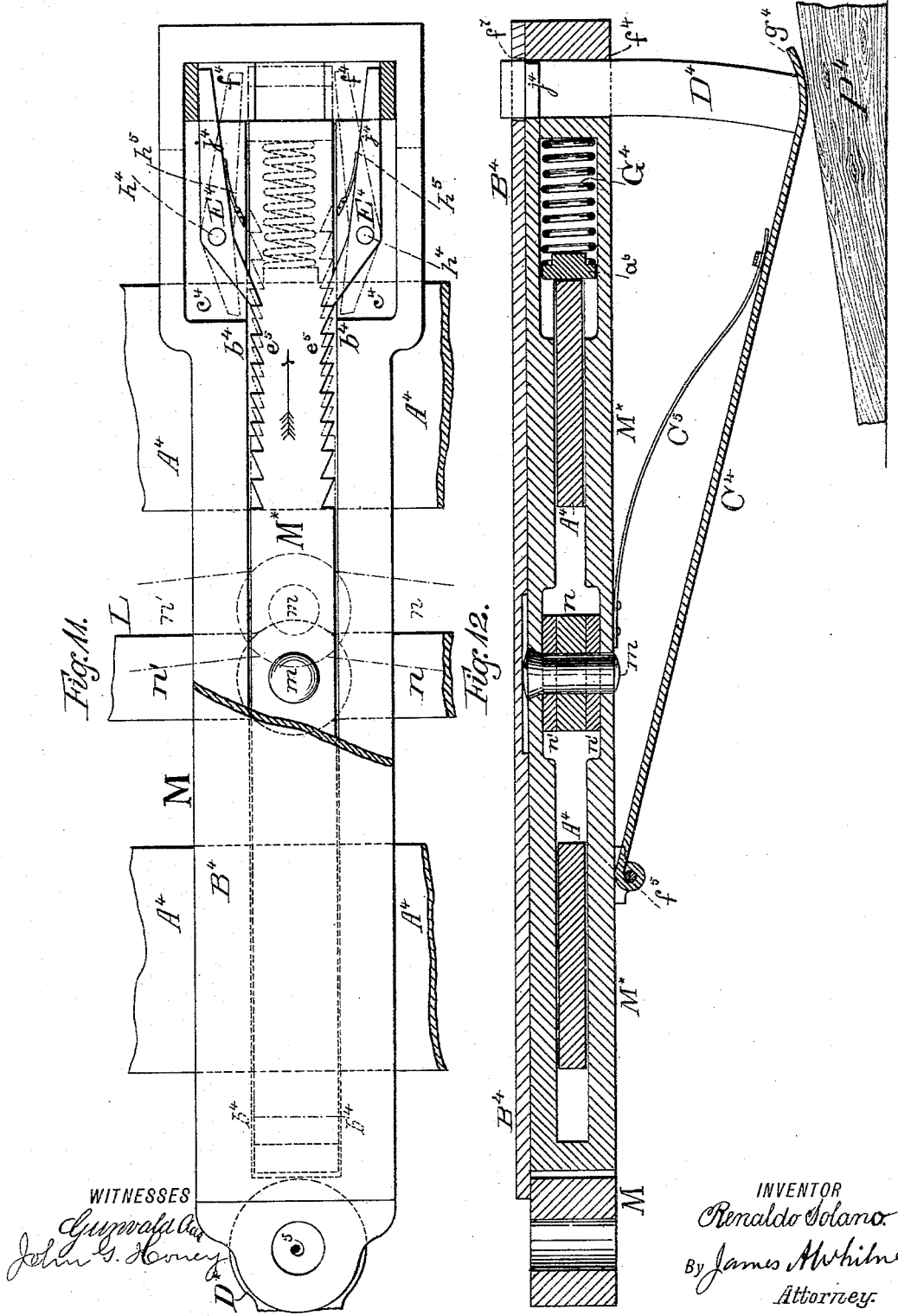

(No Model.) 7 Sheets—Sheet 6.
R. SOLANO.
CABLE RAILWAY.
No. 331,834. Patented Dec. 8, 1885.
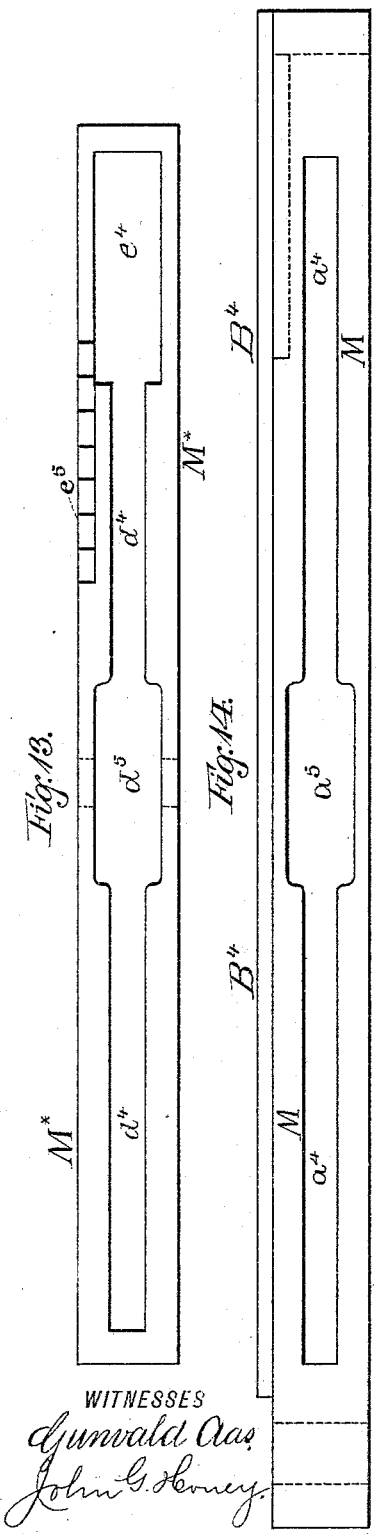
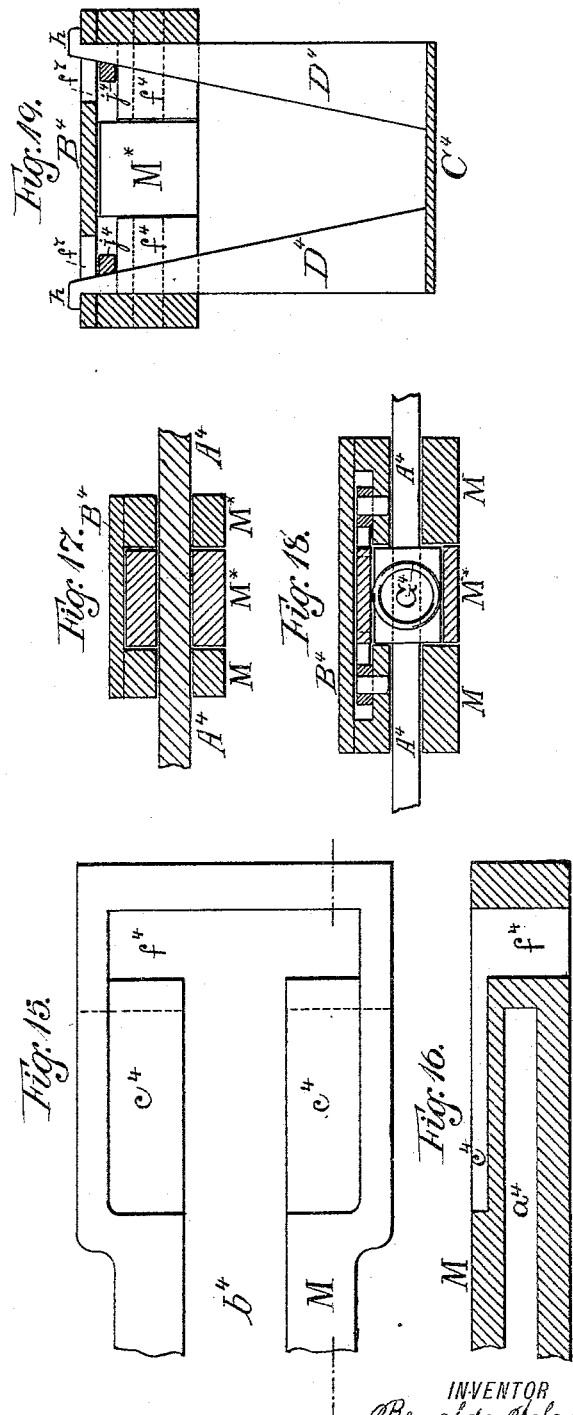

(No Model.) 7 Sheets—Sheet 7.

R. SOLANO.
CABLE RAILWAY.

No. 331,834. Patented Dec. 8, 1885.

WITNESSES
Gunvald Aas.
John G. Honey.

INVENTOR
Renaldo Solano
By James A. Whitney
Attorney

UNITED STATES PATENT OFFICE.

RENALDO SOLANO, OF BROOKLYN, NEW YORK, ASSIGNOR OF TWO-THIRDS TO JOHN W. HOWARD AND DAVID R. MORSE, BOTH OF SAME PLACE.

CABLE RAILWAY.

SPECIFICATION forming part of Letters Patent No. 331,834, dated December 8, 1885.

Application filed May 5, 1885. Serial No. 164,451. (No model.)

*To all whom it may concern:*

Be it known that I, RENALDO SOLANO, late of San Francisco, in the State of California, but now residing in Brooklyn, in the county of Kings and State of New York, have invented certain Improvements in Cable Railways, of which the following is a specification.

The object of this invention is more especially to enable the cable system of traction to be advantageously applied to the propulsion of cars on elevated railways; and it comprises certain novel means and combinations of parts, whereby the cable may be readily caught by the grip to connect the car therewith, whereby the car may be automatically released from the cable in the event of meeting an obstruction, and whereby in many and various essentials the cable or rope system of traction may be advantageously applied upon elevated railways.

Figure 1 is a vertical longitudinal sectional view of the truck of an elevated-railway car as fitted with my invention. Fig. 2 is an end view of the same. Fig. 3 is a transverse sectional view thereof on a larger scale. Fig. 4 is a plan view of the same. Figs. 5 to 21, inclusive, are detail views, also on a larger scale, of various parts of the mechanisms included in my said invention.

A are the wheels, B the axles, and C the usual horizontal frame-work, of a truck such as is ordinarily used on elevated railways. Said truck may be of any usual or suitable construction, and its connection with the car-body $A^{xx}$ may be of any suitable character, provided that it be such as to permit the truck to turn with reference to the car-body around a vertical axis of movement, as upon a bolt or like vertical pivotal connection. As represented in the drawings, this connection is made by means of the usual king-bolt, W, of the truck working in or through a suitable socket, $W^*$, provided to the car-body in such manner as to enable the one to turn with reference to the other. The number of trucks employed in the car is of course a matter of judgment.

The car-body $A^{xx}$ may be of the usual or any suitable construction.

One truck fitted with my invention is sufficient in the propulsion of a single car or single train of cars.

D is the cable or wire rope, which is endless and operated and supported by the means and devices usual in cable-traction, or any other suitable means. It is intended to run between the usual rails, E, upon which rest and run the wheels A of the truck. A strong support for the grip is furnished in the following manner, but any suitable support may be employed. Upon the foremost axle of the truck are placed axle-boxes $B^*$, and from one side of the lower part of the truck-frame to the other is placed a strong cross-bar, $C^*$. Screwed or otherwise securely fixed to these boxes $B^*$ and on the cross-bar $C^*$ is a plate or horizontal frame, B', which forms the immediate support of the gripping apparatus. This horizontal frame-work B' is provided with vertical guides A', in which run the sliding standards B" of a horizontal frame, F. This frame carries the grip mechanism, as hereinafter set forth.

The frame F has fixed to it a vertical screw, C', which passes through a nut, D', which forms the hub or boss of a wheel, E'. This wheel has its said hub or boss elongated above and below to form guides or journals $a$, which work in suitable bearings, $b$, provided to the frame-work B', as more fully shown in Fig. 3. By turning the wheel E' the frame F may be raised and lowered.

Figure 21:
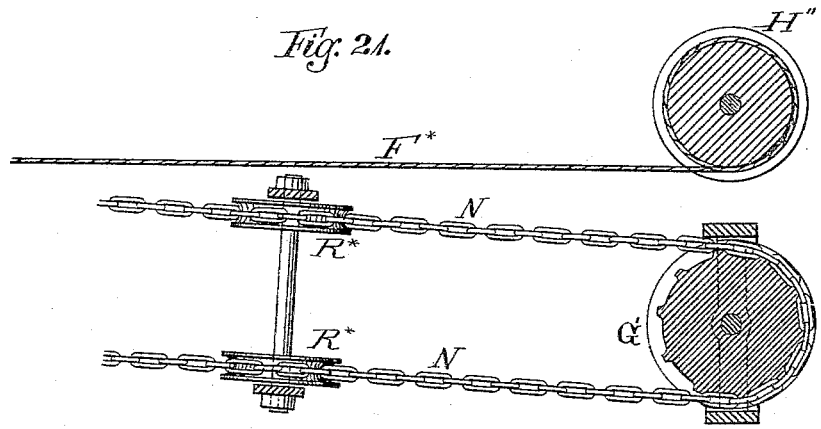

Around the wheel E', as shown in Fig. 1, is passed an endless chain, N, the links of which may fit in recesses in the periphery of the wheel to insure the rotation of the wheel by that of the chain. The opposite or forward end of said chain is passed around an actuating-wheel, G', as shown in Fig. 21, said actuating-wheel corresponding in character to the wheel E' and attached to the lower end of a vertical shaft, A", which works in suitable bearings carried by the frame-work $C^{}$ of the platform, and which has at its upper extremity a hand-wheel, $G^x$, by which it may be turned. By turning said hand-wheel $G^x$, therefore, the wheel E' may be operated to lift and lower the frame F. A ratchet-wheel, $c$, may be provided to the vertical shaft A" to act in conjunction with a pawl, $c'$, on the frame $C^{}$ to prevent the reverse movement of the shaft when the frame F is elevated. When the said frame is to be lowered, the pawl is thrown out of connection with the ratchet-wheel. A jaw, H, is fixed to the under side of the frame F, and its inner side should be semicircularly recessed on an arc proportioned to the diameter of the cable, as shown at $f'$. A movable jaw, I, opposite the fixed jaw H, and having a correspondingly-shaped inner side, is fast to and dependent from the inner end of a horizontal sliding bar, H′, which works in guides $g$ in the frame F. The outer end of this bar is pivoted to the inner end of the inner link, $n$, of a toggle-joint, L, the central point of which is shown at $m'$, and the outer end of the outer link, $n'$, of which is pivoted to a slide, $r$, by a pivot, $n''$, which said slide works in suitable guides in the frame F, and which may be adjusted by a screw, $r^2$. A wheel, G, circumferentially grooved, is supported by a suitable bearing, $g'$, at the lower end of a swinging bracket, K, the upper end of which is pivoted, as shown at $h$, to the frame F. In this bracket K is a curved slot, $i$, into which extends a strong stud or pin, $a^2$, fast to and projecting from the adjacent side of the movable jaw I. The sliding bar H′ and the guide in which it is placed are of course transverse to the length of the truck—in other words, to the direction of the cable—so that the movable jaw I and the wheel G may operate laterally in connection with said cable, as hereinafter explained.

Longitudinal upon the frame F of the truck, and therefore transverse to the toggle-joint L, is a longitudinally-movable bar, M, the construction of which is more fully shown in the larger detail views, Figs. 11 to 19. As shown in said figures, this bar M is constructed with a horizontal slot, $a^4$, through which pass the side portions, $A^4$, of the frame F, as illustrated more clearly in Figs. 17 and 18, the position of said bar M being more clearly illustrated in Fig. 4. The bar M is thus, so to speak, placed astride of the frame F, and the slot $a^4$ being longer than the width of the frame, a longitudinal movement is permitted to said bar M. The slot $a^4$, at or about the middle of the bar M, is chambered or enlarged, as shown at $a^5$ in Fig. 14, to permit of the working of the toggle-joint L, as hereinafter further explained. The said bar M is furthermore vertically slotted in a longitudinal direction, as shown at $b^4$, partly in full and partly in dotted outline in Fig. 11. This slot $b^4$ extends quite through from the upper to the under side of the bar M; but when the parts have been properly arranged in position, as herein explained, the upper side of said slot may be covered by a cap-plate, $B^4$, bolted or otherwise duly secured in place.

At one end of the bar M, continuous with the vertical slot $b^4$, are rabbets $c^4$, and to the opposite end of said bar M, by means of a suitable bolt, pin, or other suitable device, $c^5$, is attached a rod, $D^*$, the purpose of which will hereinafter presently appear.

Placed within the vertical slot $b^4$, and of a length sufficiently less than said slot to permit it to move lengthwise therein, is a slide-bar, $M^*$. This slide-bar $M^*$ is slotted horizontally, as shown at $d^4$ in Fig. 13, the said slot $d^4$, when the slide-bar is in place, as just described, and as shown in Fig. 11, being coincident with the slot $a^4$ of the bar M, the said slide-bar further having the slot $d^4$, chambered and enlarged at $d^5$, the latter being coincident with the chambered or enlarged part $a^5$ of the slot $a^4$ of the bar M at that end of the slide-bar $M^*$ nearest to the rabbeted portion $c^4$ of the bar M. The slot $d^4$ is enlarged to form a chamber, $e^4$. The slide-bar $M^*$, like the bar M, has the parts $a^4$ of the frame F passed through it, so that it is sustained thereby in the same manner as the bar M. The upper part of the slide-bar $M^*$ is formed with racks $e^5$, the position and the arrangement of which are more fully shown in the plan view and horizontal section, Fig. 11. The pin or bolt $m$, which connects the links $n$ and $n'$, also passes through the upper and lower parts of the slide-bar $M^*$, the central or pivoted ends of the toggle-joint being thus situated in the enlarged or chambered portion $d^5$ of the slide-bar $M^*$, while the links themselves project laterally through the correspondingly enlarged or chambered portion $a^5$ of the bar M. When the slide bar $M^*$ is moved in one direction—as, for example, toward the left, as the parts are represented in Figs. 11 and 12—the toggle-joint L, composed of the links $n\ n'$, will be straightened, as shown in full outline in Fig. 11, whereas if the slide-bar $M^*$ be moved in the opposite direction said toggle-joint will be bent or have its links brought to an angle to shorten the toggle-joint, as shown in dotted outline in said Fig. 11.

Formed in the outer corners of the rabbeted part $c^4$ of the sliding bar M are vertical openings $f^4$, the position of which is more clearly shown in Figs. 11, 12, 15, 16, and 19.

Pivoted to the under side of the bar M, as represented at $f^5$ in Fig. 12, is an inclined plate $C^4$, the outer and lower extremity of which is curved into the shoe-like form shown at $g^4$ in said Fig. 12. This inclined plate $C^4$ is shown in cross section in Fig. 19, and has provided at its said outer and lower extremity two inclined planes or wedges, $D^4$, the outer sides of which are vertical and the inner sides of which are inclined, as represented in said Fig. 19. The plate $C^4$ may be pressed downward by a spring, $C^5$, attached to the under side of the bar M.

In order to limit the downward movement of the plate $C^4$ the upper extremities of the wedges $D^4$ may extend upward through suitable openings, $f^7$, in the plate $B^4$, and have provided upon them laterally-projecting lips or studs $h$, which on occasion may catch and hold at the upper edges of said opening $f^7$, as shown in Fig. 19.

Arranged horizontally in the rabbeted parts $c^4$ of the bar M, and pivoted therein, as shown at $h^4$, are pawls $E^4$, arranged to catch or grip into the notches of the racks $e^5$ of the slide-bar $M^*$. Springs $h^5$ are arranged to press the pawls into the notches of said racks $e^5$, preferably by a bearing against the shanks $j^4$ of said pawls. The outer extremities of said shanks of said pawls rest against the inner sides of the upper extremities of the wedges $D^4$, so that when the plate $C^4$ runs upon a fixed incline placed in due relation with the tracks of the railway at the terminus thereof, or at any other suitable place, the said fixed incline $P^4$ will force upward the wedges $D^4$, and these will move inward the shanks $j^4$ of the pawls $E^4$, and thereby bring the said pawls out of connection with the racks $e^5$ of the slide-bar $M^*$. When the wedges $D^4$ are suffered to descend, they relieve the shanks $j^4$ of the pawls $E^4$, and the springs $h^5$ cause the said pawls to again clutch or connect with the racks of said slide-bar $M^*$.

Placed in the chamber or enlargement $e^4$ of the slot $d^4$ of the slide-bar $M^*$ is a spring, $G^4$, the outer end of which bears against the outer end of said chamber or enlargement $e^4$, while the inner end bears against the fixed resistance afforded by the adjacent part $A^4$ of the frame F, said spring thus having a tendency to push longitudinally outward the slide-bar $M^*$ in the direction indicated by the arrow in Fig. 11. When desired, a suitable washer, $a^6$, may be interposed between the spring and the part $A^4$ of the frame F to afford a better bearing unto the spring.

The rod $D^*$, hereinbefore described with reference to Fig. 11 as connected by the pin $c^5$ with the bar M, is extended to and connected with the lower end of a lever, $E^*$, as represented in Fig. 1. This connection should be made by means of a transverse pin or bolt, $b^6$, passed through the forked end of the rod $D^*$, which is passed astride of the slotted lower arm of said lever $E^*$, with said pin or bolt passed through the slot $c^6$ of said lever. The object of this free connection of the rod $D^*$ with the lever $E^*$ is hereinafter explained. The pivot or fulcrum $e^6$ of the lever $E^*$ is fixed with reference to the usual or permanent frame of the truck, and has attached to its upper arm a more or less flexible rope or chain, $F^*$, which extends to a winding-drum, H, which is carried on the platform $C^{}$ of the car. This platform with its adjuncts is represented in the vertical elevation, Fig. 20, and must not be confused with the usual frame, C, of the truck, the platform $C^{}$ being a part of the car-body which rests on the trucks of the car. The rope or chain $F^*$, which is connected with the lever $E^*$, as represented in Fig 1, and hereinbefore explained, has its opposite extremity attached to the winding-drum $H''$, so that it can be wound thereon, as represented in Fig. 20. The winding-drum is placed on the lower end of a vertical shaft, $H^2$, which has at its upper end the hand-wheel $H^*$. The position of this shaft is indicated in Fig. 20 as behind the other shaft, $A''$, and which is shown in said figure as broken away to display the shaft $H^2$ behind it. The shaft $A''$ has at its upper extremity a hand-wheel, $G^*$, the purpose of said shaft $A''$ being hereinafter explained. The shaft $H''$ is provided with a ratchet-wheel and pawl corresponding to the ratchet-wheel $c$ and pawl $c'$, and for a similar purpose. The rope or chain $F^*$, being wound upon the drum $H''$, as shown in Fig. 20, pulls upon the upper arm of the lever $E^*$, so that the lower arm of said lever, acting through the rod $D^*$, draws upon the bar M, as indicated in Fig. 1. This said bar M being gripped to the slide-bar $M^*$ by means of the pawls $E^4$ and ratchets $e^4$, moves the said bar inward to straighten the toggle-joint L by bringing the links $n$ $n'$ in line with each other, as shown in Figs. 4 and 11. Inasmuch as the outermost link, $n'$, moves around or upon a stationary pivot, $n''$, it follows that the straightening of the toggle-joint pushes inward or backward the horizontal sliding bar $H'$, which carries the movable jaw I. The pin $a^2$, working against the sides of the slot $i$ of the swinging bracket K, causes the said bracket to swing downward and inward underneath the cable D, so as to sustain the cable in proper relation with the jaws H I when the latter are about to seize or grip upon the cable, the further or continued movement of the sliding bar $H'$ gripping the cable between the said jaws, so that the motion of the cable is transmitted to the gripping mechanism, and consequently to the truck. When the jaws have gripped the cable, as described, the frame F is raised, and is retained in its elevated position until it is desired to release the gripping device from the cable, in which case the said frame F is again lowered. Inasmuch as the frame F moves vertically, the distance from the end of the bar M to the point of connection of the rod $D^*$ with the lever $E^*$ would relatively increase, and this would prematurely act upon the bar M to actuate the sliding bar $H'$ and its connected gripping mechanism if no means were provided to counteract this tendency. This is done by the sliding pivoted pin $b^6$, which, passing through the slot $c^6$ in said lever, connects the rod $D^*$ therewith in such manner that as the rod is moved to operate the sliding bar $H'$, the pin $b^6$ moves upward in the slot, thus practically diminishing the length of the lower arm of the lever, and lessening the movement of the rod in proportion as the straight downward movement of the frame F describes a tangent with a circle, the axis of which is the pivot $e^6$ of the said lever $E^*$.

In order that the wheel G shall pass readily under the cable D, as aforesaid, its edge should be preferably beveled, as shown at $r$.

For the gripping of the cable, as just explained, it is necessary that the frame F and its appurtenances should be lowered to the position represented in dotted outline in Fig. 2, in which the cable D is in the position occupied by it upon the usual carrying pulleys or sheaves. These carrying pulleys or sheaves, being of the ordinary or usual character and arrangement, call for no special description here. When the rope or chain F* is relaxed by permitting the winding-drum H and its shaft H' to turn in an opposite direction, the bar M and slide-bar M*, moving as one, by the action of the spring G⁴ bend the toggle-joint L, as indicated in dotted outline in Figs. 4 and 11, thereby reversing the movement of the slide-bar H' and its jaw I, and throwing the wheel G backward and outward away from the cable D, as shown in the dotted outline in Fig. 2, and thus releasing the grip, and consequently the truck from the cable.

As hereinbefore explained, the frame F is lowered preparatory to gripping the gripping devices upon the cable D, and is then elevated during the propulsion of the truck, and the car supported by and connected with the said truck; but the gripping devices may be released from the cable D either with or without lowering the said frame F. As also hereinbefore explained, the raising and lowering of said frame F is provided for by means of the screw C' and the internally-threaded boss or nut of the wheel E'. To more conveniently actuate the wheel E' there is passed around the same, and gearing therewith, the endless chain N, as shown in side view in Fig. 1. The opposite end of this chain N is passed around a suitable sprocket-wheel, G', as shown in plan and partial horizontal section in Fig. 21, the said sprocket-wheel being attached to and operated by the vertical shaft A" on the car-platform C**, which said shaft A" and its hand-wheel G* are hereinbefore described. In order to properly guide the endless chain N in due relation with the wheel E' and sprocket-wheel G', guide-rollers R, supported in suitable journals on the frame B', are passed above said endless chain adjacent to the part B', as shown in Fig. 1, and similar rollers suspended in suitable bearings attached to the platform C** are placed under the said chain adjacent to the sprocket-wheel P, as shown in Figs. 20 and 21. It is of course to be understood that the rollers R are substantially the same as the rollers R*, except as concerns their difference in location, as just hereinbefore explained. By turning the sprocket-wheel G' in one direction or the other by means of the shaft A" and hand-wheel G* a corresponding motion is given to the wheel E' to raise or lower, as the case may be, the frame F. When it is desired that the gripping mechanism be automatically released from the cable D, an inclined frame, P⁴, is fixed in such relation to the track that the shoe-like end $g^4$ of the inclined plate C⁴ will pass up the inclined upper surface of said incline P⁴, thereby driving upward the wedges D⁴, (shown in Figs. 11 and 19 and hereinbefore described,) releasing the pawls E⁴ from the racks $e^5$ of the slide-bar M* and permitting the spring G⁴ to act independently upon the bar M* to drive the same in an outward direction, thereby bending or shortening the toggle-joint L and actuating the sliding bar H' and the gripping devices the same as when the toggle-joint is shortened by the simultaneous backward movement of the slide-bar M* and the bar M, as hereinbefore explained. When the wedges D⁴ are permitted to drop, the pawls E⁴ are released to again catch in the racks $e^5$, and the bar M being moved in an outward direction said pawls E⁴ may be brought to their previous or any desired place along the length of the racks $e^5$.

By combining in certain features of my invention the vertically-movable supplemental frame F with the truck, I am enabled to provide cable-traction to elevated railways without the use of a "special dummy," so called, which has heretofore been considered essential to cable-traction on such roads, and which constituted, in fact, a draft-engine separate from the car or cars to be drawn, as compared with my invention, constituting a source of great and useless expense and loss of power.

In practice the front and rear truck of each car may each be provided with the grip mechanism herein explained. In other words, the herein-described invention may be duplicated to provide an apparatus for each truck, so that the car can be run either way without turning around. Further, when so arranged or provided the two mechanisms may be simultaneously applied to afford, under exceptional circumstances, an exceptionally firm hold upon the cable. This duplication of the mechanism, however, is a matter merely of choice, the apparatus being capable of extremely advantageous operation when used singly, as shown in the drawings and hereinbefore set forth.

What I claim for my invention is—

1. In a cable-railway apparatus, the combination of the following elements, to wit: a car-body, a truck independent of said car-body, but supporting a portion of the weight thereof, and connected therewith by a vertical bolt or like vertical connection, a supplemental frame arranged to be raised and lowered with reference to the said truck, and carried thereby, and gripping mechanism carried by said supplemental frame and arranged to clutch or grip the cable when lowered with the said frame, substantially as and for the purpose herein set forth.

2. In a cable-railway apparatus, the combination of a truck, a supplementary frame arranged to be raised and lowered with reference to the said truck, a screw and nut for raising and lowering said supplemental frame, and gripping mechanism carried by said supplemental frame and arranged to clutch or grip the cable when lowered with the said frame, substantially as and for the purpose herein set forth.

3. In a cable-railway apparatus, the combination of a truck, a supplemental frame arranged to be raised and lowered with reference to said truck, a vertically-movable screw, C', an internally-threaded nut, boss, or wheel, E', bearings $b$ for said nut, boss, or wheel, and a gripping mechanism carried by the supplemental frame and arranged to clutch or grip the cable when lowered, substantially as and for the purpose herein set forth.

4. In a cable-railway apparatus, the combination of a truck, a supplemental frame, F, arranged to be raised and lowered with reference to said truck, a jaw, H, fixed with reference to said frame F, a jaw, I, carried by said frame and laterally movable with reference to the fixed jaw H, a wheel, G, and pivoted suspending-bracket K, and means, substantially as described, for actuating the movable jaw, the wheel, and the bracket in unison, substantially as and for the purpose herein set forth.

5. In a cable-railway apparatus, the combination of a truck, a supplemental frame capable of being raised and lowered with reference thereto, a screw, C', internally-threaded wheel E', endless chain N, sprocket-wheel G', shaft A'', hand-wheel G*, and guide-rollers R and R*, all substantially as and for the purpose herein set forth.

6. In a cable-railway apparatus, a gripping device composed of a fixed jaw, H, a sliding movable jaw, I, having a laterally-projecting stud or pin, $a^2$, a wheel, G, and a pivoted bracket, K, constructed with a slot, $i$, to receive the stud or pin $a^2$, all substantially as and for the purpose herein set forth.

7. In a cable-railway apparatus, the combination of a vehicle carrying a horizontal frame, B', a supplemental frame, F, capable of being raised and lowered with reference thereto, a movable gripping-jaw, a toggle-joint actuating said jaw, a sliding bar, M, arranged to actuate the toggle-joint to operate the movable jaw to grip upon the cable when the supplemental frame is lowered, a rod, D*, and lever E*, having its pivot fixed with reference to the vehicle itself and slotted at its lower arm where the rod D* is attached thereto, all substantially as and for the purpose herein set forth.

8. In a cable-railway apparatus, the combination of a movable gripping-jaw, a toggle-joint arranged to actuate said jaw, a slide-bar, M*, arranged to actuate said toggle-joint and constructed with a rack or racks, $e^5$, a bar, M, constructed to receive the said slide-bar and provided with pawls E⁴, spring G⁴, wedges D⁴, and a plate, C⁴, constructed and arranged to act in conjunction with an incline, P⁴, all substantially as and for the purpose herein set forth.

RENALDO SOLANO.

Witnesses:
GUNVALD AAS,
JOHN G. HONEY.